United States Patent [19]
Geiger et al.

[11] Patent Number: 4,642,707
[45] Date of Patent: Feb. 10, 1987

[54] MAGNETIC TAPE VIDEO RECORDER WITH A ONE HEAD DRUM

[75] Inventors: Erich Geiger, Unterkirnach; Jürgen Kaaden, Villingen-Schwenningen, both of Fed. Rep. of Germany

[73] Assignee: Deutsche Thomson-Brandt GmbH, Villingen-Schwenningen, Fed. Rep. of Germany

[21] Appl. No.: 582,075

[22] Filed: Feb. 21, 1984

[30] Foreign Application Priority Data

Feb. 18, 1983 [DE] Fed. Rep. of Germany ....... 3305618

[51] Int. Cl.⁴ ............................. G11B 5/52; G11B 5/56
[52] U.S. Cl. ........................................... 360/76; 360/77
[58] Field of Search ..................... 360/21, 76, 77, 107, 360/109

[56] References Cited
U.S. PATENT DOCUMENTS 4,446,497 5/1984 Hirayama ............................. 360/109

FOREIGN PATENT DOCUMENTS 57-198566 6/1982 Japan ..................................... 360/76
2076579 12/1981 United Kingdom .................. 360/76

Primary Examiner—George G. Stellar
Attorney, Agent, or Firm—Horst M. Kasper

[57] ABSTRACT

A magnetic tape recorder for video recording and video playback with a one head drum and a head support plate. According to the invention the head support plate is point supported and spring attached to a base plate. The head support plate is movable around two rotation axes and is actuated with an electromagnetic drive means. The one motion cooperates with a dynamic track following circuit for providing dynamic height level correction of the head and allows to capture tracks during replay, which deviate from the parallel inclined position or, in case of a course of the track deviating from the tape recording speed resulting in a trick palyback. The motion around the other axis allows a controlled and regulated azimuth offset of the neighboring tracks during playback, which are recorded with continuously alternating azimuth angle.

20 Claims, 8 Drawing Figures

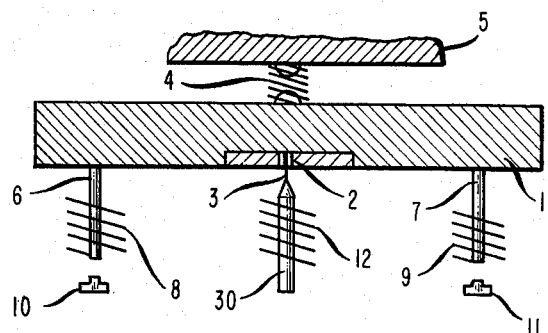
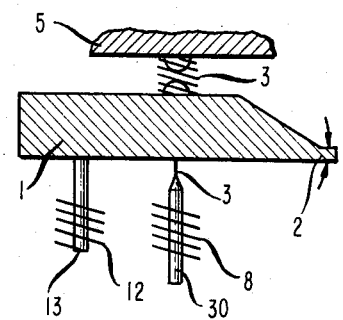
Fig. 1a  Fig. 1b
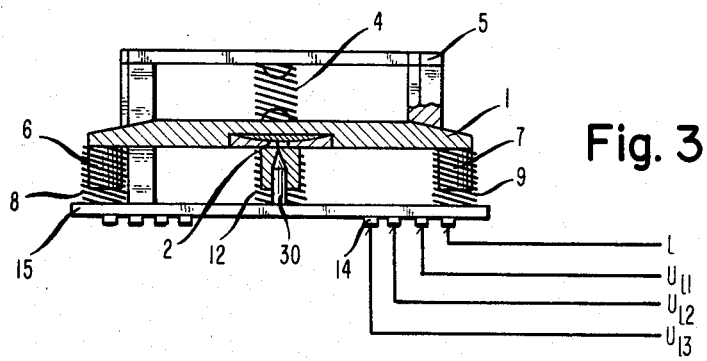
Fig. 3
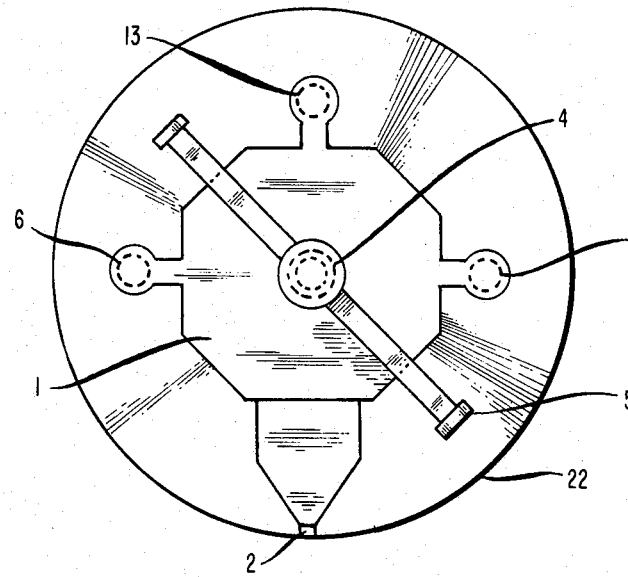
Fig. 2
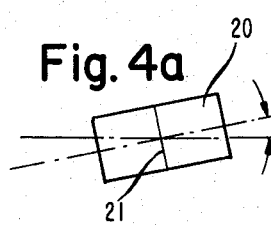
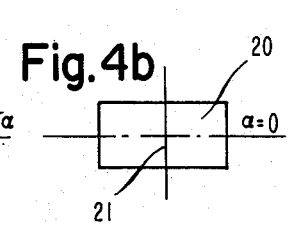
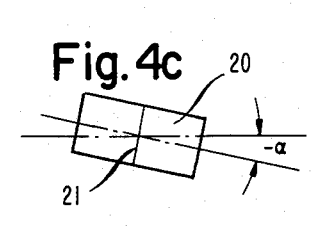
Fig. 4a  Fig. 4b  Fig. 4c

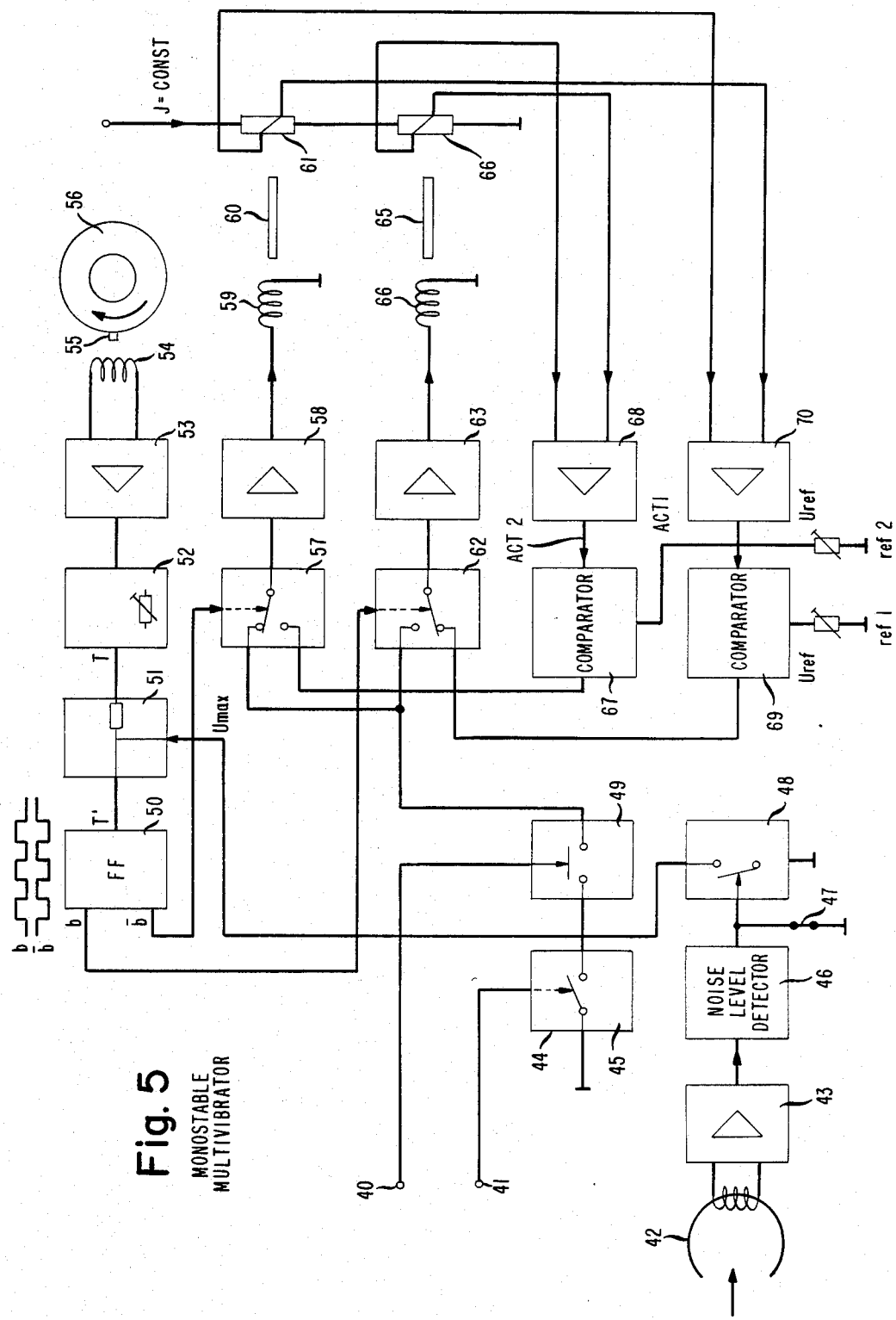

MAGNETIC TAPE VIDEO RECORDER WITH A ONE HEAD DRUM

BACKGROUND OF THE INVENTION

1. Field of the Invention

The present invention relates to a magnetic tape apparatus for the recording and playback of video signals with a rotating one head drum, which is surrounded by the recording tape like an omega over an angle of about 360 degrees.

2. Brief Description of the Background of the Invention Including Prior Art

Video recording can be classified into systems derived from a quadruplex video tape recorder and into those derived from a helical recording system. Helical scanning is obtained by wrapping the magnetic tape around a drum in a spiral fashion and employing a slant track for the recording. The drum is split into two by a slot which passes around its circumference and the recording head or recording heads rotate in the drum. If the wrap angle is chosen with the correct degree of rise from one side of the drum to the other, thru the combination of forward motion of the tape and of the rotation of the head across the tape produces a track which is aligned to the horizontal by a small angle of say for example 3 degrees.

Various conventional recorders record and play back half picture or field one after another with a head. The position of the track is the same. The head has to be surrounded like an omega. It performs for each recording track one rotation. This results in 50 rotations per second with the same number of half pictures. It is necessary to provide a relatively large track distance in order to keep the interfering cross talk to a minimum (grass). The recording density achieved in this way is not satisfactory and the use of tape length is very high. Compare for example the Poehler German Patent Applications Laid Open DE-OS No. 2,730,727; DE-OS No. 2,831,333; and DE-OS NO. 2,924,115.

An improvement of these deficiencies has been attempted according to German Patent Application Laid Open DE-OS No. 2,819,958 by providing the head slot not as a straight line, but at least in the edge regions as curved and angled at oppositely running angles.

Known two-head video recorders comprises a so-called azimuth offset of the head gaps of for example a plus-minus 6 degrees in the VHS system and can dispense nearly completely with track distance spacings without the occurrence of cross-talk in a substantial amount.

It is known from German Pat. No. 2,711,703 to realize a track follow control readjustament with a so-called level correction of the heads based on bending supports for a one head drum with an omega shaped magnetic tape wrapping around the drum. No azimuth offset is provided here. The track follow control adjustment is to permit all kinds of conceivable trick scans.

An azimuth offset of the two heads employed is provided in order to avoid cross-talk according to German Pat. No. 2,838,003. A track follow control (height level correction) with piezo-ceramic PXC-elements was also taught in this reference. Characteristic signals of four fixed frequencies are keyed in during recording in the two video frequency regions and they are employed during sensing and playback for controlling of the heads. The system has become known as DTF (dynamic track following).

All these constructions, systems and apparatus have their quirks and deficiencies. However, they do not provide a solution to a single head video recorder of smallest construction size.

SUMMARY OF THE INVENTION

1. Purposes of the Invention

It is an object of the present invention to provide a single head video recording system, which employs small components and avoids cross-talk between neighboring tracks on the tapes.

It is a further object of the present invention to provide a video recording system where the gap of the recording head is placed at differing angles relative to the longitudinal direction of the tracks and where the position of the head relative to the height level of the track is automatically adjusted.

It is another object of the present invention to provide a video recording system where the recording head gap assumes two positions which are carefully monitored and controlled in an automatic way to furnish an accurate relative position of magnetic tape tracks and of the recording head.

These and other objects and advantages of the present invention will become evident from the description which follows.

2. Brief Description of the Invention

The present invention provides a magnetic tape recorder for video recording and playback which comprises a rotary single head drum for wrapping of the recording tape, a head support pivoted around two mutually vertical axes relative to a base plate, a dynamic track follow control circuit for correcting the level position of the magnetic tape head, a first drive means actuating the head support for effecting a level correction vertical to the direction of the recording track and connected to the level control circuit, a drive motor for the head support plate, a rotary pulse generator disposed at the drive motor, switching means for shaping pulses generated by the rotary pulse generator, a second driving means for pivoting the head support plate around said second axis and for effecting an azimuth offset for neighboring recording tracks and controlled by the switching means continuously for recording and depending on the sensed signal level for playback and depending on signal changes resulting from switching pulses.

The recording tape preferably is wrapped around the head drum like an omega over an angle of about 360 degrees. For each head drum rotation a field can be recorded or, respectively, played back. The azimuth angle can be from about 5 to 15 degrees relative to the middle position such that the total motion around the second axis amounts to an angle of from about 10 to 30 degrees. Preferably, the azimuth angle is from about 8 to 12 degrees relative to the middle position such that the total motion around the second axis amounts to an angle of from about 16 to 24 degrees.

The rotary pulse generator can comprise a permanent magnet disposed at the drive motor for the head drum and a spacially fixed disposed coil magnetically engaged with the permanent magnet, which coil generates for each rotation a pulse, and can further comprise a limiting amplifier connected to the coil, a monostable multivibrator connected to the limiting amplifier for reshaping the voltage curve of the pulse versus time, and a flip-flop connected to the monostable multivibrator and to be actuated by the reshaped pulse. A video head can be provided for sensing the signals on a magentic tape. A second amplifier can be connected to the video head. A level detector can be connected to the second amplifier for determining the signal level, and electronic switching and amplifying means can be provided for determining the appropriateness of the switching phase in each case of the flip-flop depending on the selected type of playback and for activating an electrodynamic drive for the azimuth offset of the video head depending on the determination.

A flip-flop can be connected to the switching means for shaping of output pulses. Electronic switching and amplifying means can determine the appropriateness of the switching phase in each case of the flip-flop depending on the selected type of playback. An electrodynamic drive for the azimuth offset of the video head can be connected to the electronic switching and amplifying means and depend on its determination and in each case a correspondingly magnetized actuating pin can be included and mounted close to the ends of the head support plate in the same direction. A coil corresponding to the actuating pin can be spacially fixed relative to the head support plate and allow the actuating pin to enter the coil. A pivoting support for the head support plate preferably is disposed about the middle of the head support plate between two actuating pins for allowing the support plate to perform tilting motions of a limited angle.

A Hall generator coordinated to each actuating pin can be spacially fixed relative to the base plate and can be centered relative to a corresponding coil such that, depending on the switching state of the flip-flop in each case for each switching phase and alternating with its cycle, in each case the one coil is activated while the other is fed with a correction current depending on the output of one of the Hall generators, and a correction current is fed to the coil in case of a deviation from one of the reference voltages. A point support can provide a rotation point for the head support plate to allow the head support plate to rotate around two defined axes, which are disposed vertically relative to each other. A statically acting adjustment provision for the single head drum preferably is provided with two axes vertically relative to each other, that is first in the direction of its rotation axis and second in a direction vertically with respect to the magnetic tape in order to change the head drum inclination relative to the tape plane.

There can further be provided a video recorder for recording and playback, which comprises first drive means to rotate a magnetic tape head, a base plate for a video tape head joined with the first drive means, a double pivot support provided on the base plate, a head support plate supported by the double pivot support on the base plate, a magnetic recording head disposed at a peripheral end of the head support plate, a first pair of electromagnetic engagement parts attached to the base plate, a second pair of electromagnetic engagement parts corresponding to the first pair and disposed on the side of the head support plate versus the base plate such as to tilt the head support plate upon activation of the electromagnetic engagement around a first axis of the double pivot support to provide tilting of the video tape head around an axis substantially vertical to the contact surface between the tape and the video tape head, sensing elements for determining the tilting position of the heat support plate versus the base plate, an electromagnetic position control element for adjusting the distance of the video head relative to the base plate.

The electromagnetic position control element preferably comprises a coil disposed on the base plate, and a magnet rod disposed on the video head support plate for engaging the coil. The double pivot support can comprise a point support attached to the base plate, a contact surface of the head support plate disposed against the point support, a mounting bridge attached to the base plate and extending over the head support plate, and a spring supporting head support plate against the point support and restrained by the mounting bridge. A head drum can be attached to a second drive means for supporting a video tape to be engaged electromagnetically by the video head, an index magnet can be attached to the second drive means, an index coil can be disposed to be engaged electromagnetically by the index magnet upon rotation of the second drive means, a first amplifier can be connected to the index coil for amplifying the signal generated in the index coil, a monostable adjustable multivibrator connected to the first amplifier for balancing tolerances of the signal level, a flip-flop can be connected to the output of the monostable adjustable multivibrator, a second amplifier can be connected to the video head, a level detector can be connected to the second amplifier, and an electronic switch can be connected to the level detector for interrupting the connection in case the signal in the level detector is too noisy, or for connecting to the flip-flop.

A first electronic switch can be connected to one of the outputs of the flip-flop, a second electronic switch can be connected to a second output of the flip-flop, a third amplifier can be connected to the first electronic switch, a fourth amplifier can be connected to the second electronic switch, a first coil can form one of the first pair of electromagnetic engagement parts and can be connected to the third amplifier, a second coil can form the other one of the first pair of electromagentic engagement parts and can be connected to the fourth amplifier, a first magnetic pin can form one of the second pair of electromagnetic engagement parts, a second magnetic pin can form the other of the second pair of electromagnetic engagement parts, a first Hall element can be disposed on the base plate and positioned for magnetically engaging the first magnetic pin, a second Hall element can be disposed on the base plate and positioned for magnetically engaging the second magnetic pin, a fifth amplifier can be connected to the Hall output of the first Hall element, a sixth amplifier can be connected to the Hall output of the second Hall element, a first comparator can be connected to the fifth amplifier for comparing the output of the fifth amplifier with a reference voltage and can have an output connected to the first electronic switch, and a second comparator can be connected to the sixth amplifier for comparing the output of the fifth amplifier with a reference voltage and can have an output connected to the second electronic switch.

A single head drum preferably is surrounded by the magnetic tape like an omega over an angle of more than about 270 degrees, a dynamic track follow control can adjust the level of the video head and can be disposed on the base plate, a static acting adjustment provision can be furnished for the head drum vis-a-vis the magnetic tape around two axes, where the first adjustment is in the direction of the rotation axis and where the second adjustment is in a direction vertical to the first direction versus the magnetic tape in order to change the inclination of the head drum relative to the tape plane.

There is further provided a method for video recording and playback with a magnetic tape, which comprises rotating a base plate for a video head with a first drive means, point supporting a head support plate on the base plate, spring restraining the head support plate versus the base plate to retain the point support, tilting the head support plate with electromagnetic engagement parts around an axis vertical relative to the contact plane between the video head and the magnetic tape depending on a desired azimuth angle of the video head gap versus the magnetic tape, electromagnetically determining the position of the head support plate versus the base plate around said axis, and adjusting the level of the video head versus the magnetic tape with a dynamic tape follow control by tilting the head support plate around an axis vertical to the first tilting axis and vertical to the rotation axis of the base plate.

The magnetic tape can be wrapped around a head drum with a slot over an angle of at least about 270 degrees. A field can be recorded or, respectively, reproduced for each rotation of the drum head. The position of the head drum can be statically adjusted versus the magnetic tape around two mutually vertical axes where the first axis is in the direction of the rotation axis of the head drum and where the second axis is in a direction vertical to the first axis versus the magnetic tape for changing the inclination of the head drum to the tape plane. The rotary position of a head drum motor having a magnet with a coil can be sensed. The signal provided by the coil can be amplified. The amplified signal can be reshaped with a monostable multivibrator. The output of the monostable multivibrator can be fed to a flip-flop.

The signal coming from the tape head can be amplified. The level of the signal versus noise can be determined. The amplified signal can be switched off if the noise level is too high. The amplified signal can be fed to the flip-flop. One output of the flip-flop can be fed to a first electronic switch. The second output of the flip-flop can be fed to a second electronic switch. The output of the first electronic switch can be entered into a third amplifier. The output of the second electronic switch can be entered into a fourth amplifier. A first coil can be energized wtih the output from the third amplifier. A second coil can be energized with the output from the fourth amplifier. A first magnetic pin attached to the head support plate can be magnetically engaged with the current in the first coil. A second magnetic pin attached to the head support plate can be magnetically engaged with the current in the second coil. The electrons can be deflected in a first Hall probe with the magnetic field of the first magnetic pin. The electrons can be deflected in a second Hall probe with the magnetic field of the second magnetic pin. The Hall voltage generated in the first Hall probe can be amplified in a fifth amplifier. The Hall voltage generated in the second Hall probe can be amplified in a sixth amplifier. The output of the fifth amplifier can be compared with a first reference signal in a first comparator. The output of the sixth amplifier can be compared with a second reference signal in a second comparator. The output of the first comparator can be fed to the first electronic switch, and the output of the second comparator can be fed to the second electronic switch.

The invention advantageously combines the advantages of a two head video recorder with those of a single head recorder on the smallest space. The head support plate can be rotated at its middle around two mutually vertical axes. An azimuth offset opposite and changing from track to track is provided from track to track. A height level correction of the head is achieved by a circuit controlled with the rotary cycle of the head motor and controlled by the sensing level, which operates on means for controlling the angle of the heat support plate around the second axis. For example, an electro-dynamic actuation can be provided with a processing of characteristic signals similar to a dynamic track following (DTF) system and a height level control of the recording head can be effected. It is at the same time a track follow control, which can adjust deviations of the track with a control circuit of the head motor or of the tape drive servo system, and it allows to find the track and to maintain the track in case of trick effect sensing. These are head sensing processes where the playback speed differs from the recording speed.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 1a is a schematic front elevational view of a strongly simplified and magnified mounting of a head support plate with electro-dynamic drive means, FIG. 1b is a schematic side elevational view of a strongly simplified and magnified mounting of a head support plate with electro-dynamic drive means, FIG. 2 is a schematic magnified plan view of a detailed embodiment of a head support plate with its support and with the electro-dynamic drive means, FIG. 3 is a side elevational and in part sectional view of the embodiment of FIG. 2, FIG. 4a is a symbolic representation of a video head mirror in a first switching position of the azimuth offset, FIG. 4b is a symbolic representation of a video head mirror in a base position without azimuth offset, FIG. 4b is a symbolic representation of a video head mirror in a second switching position of the azimuth offset, FIG. 5 is a schematic block diagram of a control circuit for providing the azimuth offset of the gap of the video recording head.

DESCRIPTION OF INVENTION AND PREFERRED EMBODIMENTS

In accordance with the present invention there is provided a magnetic tape recorder apparatus for video recording and playback, which employs a rotating single head drum, which is wrapped around with the recording tape like an omega by an angle of about 360 degrees and where for each head drum rotation a field or half picture is recorded or is played back. A dynamic track following control circuit is used for the height level control of the head. A statically acting adjustment provision is furnished for the head drum versus the magnetic tape around two mutually vertical axes, where in fact the first axis has the same direction as the rotary axis and where the second axis has a direction vertical to the direction of the first axis and vertical to the magnetic tape and is to provide a change in the inclination of the head drum versus the magnetic tape plane. In addition to and independent of this adjustment provision there is provided a dynamically controlled head support plate 1, which can be rotated around two axes and which serves for the track by brack alternating setting of the azimuth angle of the head gap of the rotating video head. The resulting motions mutually overlap and the motion around one axis effects the height level correction across to the recording track longitudinal direction. A first electromechanical drive means actuates the head support plate, which is controlled by a suitable conventional track follower control circuit. The motion around the second axis effects an azimuth offset for adjacent recording tracks by driving the head support plate 1 around this axis with a second electromechanical drive means, which is controlled by signal changes derived from switching pulses, which are clocked by a rotary pulse provider 54, 55 at the drive motor 56 of the head drum and which are reshaped via switching means such that the head support plate 1 is continuously controlled and in case of reproduction as it depends on the sensed signal level.

The azimuth angle formed by the head gap position can be plus-minus 10 degrees starting from a middle position of zero degree and the total motion around the second axis can be 20 degrees from one field (half picture) to another field (half picture).

A permanent magnet can be attached at the drive motor for the head drum, which magnet cooperates with a spacially fixed coil as a rotary pulse generator. Upon each rotation a pulse is induced in the coil and the coil is connected to a limiting amplifier and from there to an adjustable monostable multivibrator, which reshapes the time characteristics of each pulse recieved and which thereby switches a following flip-flop. Corresponding electronic switching and amplifying means are provided which determine the appropriateness of the switching phase in each case of the flip-flop 50 depending on the selected type of playback from the output of a level detector 46, which is fed from the video head 42 via an amplifier 43 and which determines the signal level. The electronic switching and amplifying means activates depending on the result of the signal level determination of an electro-dynamic drive means for the azimuth offset of the video head 2 or, respectively, 47.

The electro-dynamic drive means for the azimuth offset comprise in each case an actuating pin 6, 7 or, respectively, 60, 65, which is correspondingly magnetized and which is mounted in the same direction near the ends of the head support plate 1 such that each of the actuating pins 6, 7 or, respectively, 60, 65 is immersed into a spacially fixed coil 8, 9. The head support plate 1 is supported in the middle between the actuating pins 6, 7 or, respectively, 60, 65 such that the slight rocking motions can be performed.

A Hall generator 10, 11 or, respectively, 61, 66 is coordinated to each actuating pin 6, 7 or, respectively, 60, 65 and is attached spacially fixed relatively to a coil 8 or 9 or, respectively, 59 or 64. In each case one of the coils 8 or 9 or, respectively, 59 or 64 is activated depending on the switching state of the flip-flop 50 for each switching phase and alternating with the clock cycle while the other coil is fed with a correction current in case of a deviation depending on the output of the one Hall generator 10 or 11 or, respectively, 61 or 66 and upon a comparison with a reference voltage.

The head support plate 1 can be provided with a movability around two axes, which are vertical with respect to each other, such that the pivot point is furnished as a point support bearing 3.

FIG. 1 is to illutrate how a head support plate 1 provided with a video head 2 is movably supported between a point support bearing 3 and a compression spring 4. The compression spring 4 itself is supported against a mounting bridge 5 indicated in FIGS. 1a, 1b, 2 and 3. The front view of FIG. 1a shows in addition magnetized pins 6 an 7, which each protrude downwardly into a coil 8 or, respectively, 9 and which are attached on the outside at the head support plate 1. These coils 8 and 9 are to be considered as attached to a base plate not shown here in a spacially fixed position. The two coils 8 and 9 are wound such that a current flow in one of them effects a tilting of the head support plate 1. This way the azimuth angle can be switched, and this is done preferably around the middle position of an angle alpha=zero degrees by about plus-minus 10 degrees. This so-called azimuth offset of neighboring tracks of an inclined or slant track recording allows to dispose the tracks next to each other without a safety distance and without the occurrence of interfering cross-talk. Each of the slant tracks comprises a field (half picture) such that the one head drum has to make 50 rotations per second in order to furnish the required number of fields (half pictures). Thus upon recording it is therefore necessary to switch continuously from one track to another. In case of playback a still to be explained control circuit serves to provide the time coordinated azimuth circuit switching.

The Hall generators 10 and 11 indicated in FIG. 1a are effective as sensors and are disposed such that they can sense motions of the pins 6 and 7 by providing corresponding signals to the control circuit.

The extreme positions of an indicated video head mirror 20 with a gap 21 are shown in FIGS. 4a and 4c. The base position of the video head mirror 20 is shown in FIG. 4b.

Oppositely running arrows are entered along the extension of the gap 21 in the base position of the video head mirror 20, which is to indicate a vertical movability of the video head 20. This vertical movability is achieved based on a coil 12 and a magnetic pin 13 as can be recognized from FIG. 1b. A known dynamic track following (DTF) system realizes a track follower control system, which not only controls and balances tape speed variations possibly caused by the capstan servo system during playback and the result of which is track deviations from the straight line slanted course, but which in addition allows certain trick effect reproduction playback such as standing picture, quick motion and slow motion effects. For better understanding it is to be considered that a uniform tape speed is a condition for obtaining a recording with inclined or slanted tracks, closely disposed relative to each other and running along straight lines. In the case of a trick playback the video head has to be controlled differently with deviations of up to about 200 micrometers.

A detailed view of the embodiment of the electro-dynamic drive means contained in the single head drum can be recognized in FIGS. 2 and 3. The parts corresponding in their position to parts of FIGS. 1a and 1b received the same numerals. A mounting bridge 5 disposed on the base plate 15 is located witin the periphery of the head drum 22 indicated in FIG. 2. The head support plate point supported by a pin 30 is maintained in position on the other side by a compression spring 4 by the resting against the mounting bridge 5. Sliding contacts 14 are indicated at the bottom side of the base plate 15, which are connected with corresponding potentials of the control circuit. Details of the electronic currants are set forth in FIG. 5 and in the description associated with FIG. 5.

An index magnet 55 is attached at the head drum motor 56 and it cooperates with an index coil 54 as a rotation signal generator. The pulses generated are amplified in an amplifier 53 and are limited and are reshaped by a following adjustable monostable multivibrator 52 with respect to their course over time. The monostable multivibrator 52 has to be adjustable in order to allow for balancing of mechanical tolerances of the position of the magnet and of the coil position. They serve to switch a flip-flop 50 via a resistance member 51. Thus the output of the flip-flop 50 is changed once for each rotation of the motor.

In case of a standing picture playback an H-potential passes via the input 41 to the electronic switch 44 and closes the switch. This maintains the switched phase of the flip-flop 50 constant. In case of a single picture or slow motion operation an H-potential passes from the input 40 to the electronic switch 49 and closes the switch. The output phase of the flip-flop 50 is changed upon each motor switching command.

The azimuth angles of neighboring tracks have to be continuously switched during recording and therefore the switch 47 remains closed. In case of replay, the level detector 46 tests the signal provided by the video head via an amplifier 43 and thus the switching phase of the flip-flop 50. If it is not correct, that is the level is too low, then the output state of the flip-flop 50 is maintained up to the right switching phase.

The two outputs b and b̄ (inverted) are connected to the electronic switches 57 and 62, which are switched oppositely by these output signals. The electronic switch 48 follows the level detector 46 and is closed in case of noise, that is a level too low, and is opened in case of a sufficient signal. An amplifier 58 or, respectively, 59 follows the electronic switches.

The electro-dynamic drive means for the azimuth offset or the azimuth switching described in the previously illustrated FIGS. are provided by the coils 59 and 64, which magnetically engage the pins 61 and 66 upon activation, as well as the two Hall generators 61 and 66, which are passed by a constant current as indicated. Their Hall voltage generated depending on the motion of the pins 60 and 65 is prepared and amplified by the amplifiers 68 and, respectively, 70 and is fed in each case to the following signal comparators 67 or, respectively, 69, which represent the "actual signal 2" and the "actual signal 1". In addition, a reference voltage $U_{ref}$ derived from "reference 1" and "reference 2" is fed in via separated adjustable resistors to the comparators 67 and 68 as indicated in FIG. 5.

The functioning of the azimuth circuit can be explained as follows: As already mentioned the coils 59 and 64 are the actuating coils. If the coil 59 is actuated by feeding a signal from the b̄-output of the flip-flop 50 via the electronic switch 57 and the following amplifier 58, then at the same time the Hall voltage of the Hall generator 61 is compared with the reference voltage $U_{ref}$. If a deviation occurs, then the coil 64 is activated until this deviation is balanced. At the next clock cycle of the flip-flop 50 this control system is switched, the electronic switches 57 and 62, and thereby initially the coil 64 is fully activated, the Hall voltage of the Hall generator 66 is measured or, respectively, compared and is balanced based on the coil 59.

The output signals b and b̄ of the flip-flop 50 then control the activation of the coils 59 and 64. Upon playback the signal from the video head 42 is then amplified in the amplifier 43 and is tested in the level detector 46 with regard to the noise level. If a signal is present, which can be processed and evaluated, then this is interpreted as an azimuth angle uniformly running with the recording and the flip-flop clock cycle is released.

This switching and testing function is out of operation during recording. During standing picture playback the actual switching phase is maintained so long until the regular mode of operation is switched on. In case of the playback and reproduction of individual pictures or frames the tape is transported by a track width by the capstan motor and at the same time the azimuth angle of the video head is changed by generating a clock pulse.

It is essential for the functioning of the control circuit and of the azimuth change provision effected therewith that the vertical pulse duration time is available as a transient response settling time into the new head position or arrangement. Only the small head support and moving part masses of this system allow a practical application in a magnetic tape apparatus for video recording and playback with a one head drum.

It will be understood that each of the elements described above, or two or more together, may also find a useful application in other types of magnetic recording systems configurations and processing procedures for tape recorded signals differing from the types described above.

While the invention has been illustrated and described as embodied in the context of a magnetic tape video recorder with a one head drum, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A magnetic tape recorder for video recording and playback comprising
   a rotary single head drum to be wrapped by the recording tape;
   a base plate;
   a head support pivoted around two mutually vertical axes relative to the base plate;
   a dynamic track follow control circuit for correcting the level position of the magnetic tape head;
   a first drive means actuating the head support for effecting a level correction vertical to the direction of the recording track and connected to the level control circuit;
   a drive motor for the head support plate;
   a rotary pulse generator disposed at the drive motor;

switching means for shaping pulses generated by the rotary pulse generator;

a second driving means for pivoting the head support plate around said second axis and for effecting an azimuth offset for neighboring recording tracks and controlled by the switching means continuously for recording and depending on the sensed signal level for playback and depending on signal changes resulting from switching pulses.

2. The magnetic tape recorder for video recording and playback according to claim 1 wherein the recording tape is wrapped around like an omega over an angle of about 360 degrees.

3. The magnetic tape recorder for video recording and playback according to claim 1 wherein for each head drum rotation a field is recorded or, respectively, played back.

4. The magnetic tape recorder for video recording and playback according to claim 1 wherein the azimuth angle is from about 5 to 15 degrees relative to the middle position such that the total motion around the second axis amounts to an angle of from about 10 to 30 degrees.

5. The magnetic tape recorder for video recording and playback according to claim 4 wherein the azimuth angle is from about 8 to 12 degrees relative to the middle position such that the total motion around the second axis amounts to an angle of from about 16 to 24 degrees.

6. The magnetic tape recorder for video recording and playback according to claim 1 wherein the rotary pulse generator comprises a permanent magnet disposed at the drive motor for the head drum and a spacially fixed disposed coil magnetically engaged with the permanent magnet, which coil generates for each rotation a pulse; and further comprising a limiting amplifier connected to the coil;

a monostable multivibrator connected to the limiting amplifier for reshaping the voltage curve of the pulse versus time; and a flip-flop connected to the monostable multivibrator to be actuated by the reshaped pulse.

7. The magnetic tape recorder for video recording and playback according to claim 6 further comprising a video head for sensing the signals on a magnetic tape;

a second amplifier connected to the video head;

a level detector connected to the second amplifier for determining the signal level; and electronic switching and amplifying means for determining the appropriateness of the switching phase in each case of the flip-flop depending on the selected type of playback and for activating an electrodynamic drive for the azimuth offset of the video head depending on the determination.

8. The magnetic tape recorder for video recording and playback according to claim 1 further comprising a flip-flop connected to the switching means for upgrading pulses;

electronic switching and amplifying means for determining the appropriateness of the switching phase in each case of the flip-flop depending on the selected type of playback;

an electrodynamic drive for the azimuth offset of the video head connected to the electronic switching and amplifying means and depending on its determination and in each case including an actuating pin correspondingly magnetized and mounted close to the ends of the head support plate in the same direction;

a coil corresponding to the actuating pin and spacially fixed relative to the head support plate and allowing the actuating pin to enter the coil;

a pivoting support for the head support plate and disposed about the middle of the head support plate between two actuating pins for allowing the support plate to perform tilting motions of a limited angle.

9. The magnetic tape recorder for video recording and playback according to claim 1 further comprising a Hall generator coordinated to each actuating pin and spacially fixed relative to the base plate and centered relative to a corresponding coil such that depending on the switching state of the flip-flop in each case for each switching phase and alternating with its cycle in each case the one coil is activated while the other one is fed with a correction current depending on the output of one of the Hall generators and feeding a correction current to the coil in case of a deviation from one of the reference voltages.

10. The magnetic tape recorder for video recording and playback according to claim 1 further comprising a point support providing a rotation point for the head support plate to allow the head support plate to rotate around two defined axes, which are disposed vertically relative to each other.

11. The magnetic tape recorder for video recording and playback according to claim 1 further comprising a statically acting adjustment provision for the single head drum, which is provided with two axes vertically relative to each other, that is first in the direction of its rotation axis and second in a direction vertically with respect to the magnetic tape in order to change the head drum inclination relative to the tape plane.

12. A magnetic tape recorder for video recording and playback comprising first drive means to rotate a magnetic tape head;

a base plate for a video tape head joined with the first drive means;

a double pivot support provided on the base plate;

a head support plate supported by the double pivot support one the base plate;

a magnetic recording head disposed at a peripheral end of the head support plate;

a first pair of electromagnetic engagement parts attached to the base plate;

a second pair of electromagnetic engagement parts corresponding to the first pair and disposed on the side of the head support plate versus the base plate such as to tilt the head support plate upon activation of the electromagnetic engagement around a first axis of the double pivot support to provide tilting of the video tape head around an axis substantially vertical to the contact surface between the tape and the video tape head;

sensing elements for determining the tilting position of the head support plate versus the base plate; and electromagnetic postition control means for adjusting the distance of the video head relative to the base plate.

13. The magnetic tape recorder for video recording and playback according to claim 12 wherein the electromagnetic position control element comprises a coil disposed on the base plate;
- a magnet rod disposed on the video head support plate for engaging the coil.

14. The magnetic tape recorder for video recording and playback according to claim 12 wherein the double pivot support comprises
- a point support attached to the base plate;
- a contact surface of the head support plate disposed against the point support;
- a mounting bridge attached to the base plate and extending over the head support plate;
- a spring supporting the head support plate against the point support and restrained by the mounting bridge.

15. The magnetic tape recorder for video recording and playback according to claim 12 further comprising second drive means;
- a head drum attached to the second drive means for supporting a video tape to be engaged electromagnetically by the video head;
- an index magnet attached to the second drive means;
- an index coil disposed to be engaged electromagnetically by the index magnet upon rotation of the second drive means;
- a first amplifier connected to the index coil for amplifying the signal generated in the index coil;
- a monostable adjustable multivibrator connected to the first amplifier for balancing tolerances of the signal level;
- a flip-flop connected to the output of the monostable adjustable multivibrator;
- a second amplifier connected to the video head;
- a level detector connected to the second amplifier; and
- an electronic switch connected to the level detector for interrupting the connection in case the signal in the level detector is too noisy and connected to the flip-flop.

16. The magnetic tape recorder for video recording and playback according to claim 15 further comprising
- a first electronic switch connected to one of the outputs of the flip-flop;
- a second electronic switch connected to the second output of the flip-flop;
- a third amplifier connected to the first electronic switch;
- a fourth amplifier connected to the second electronic switch;
- a first coil forming one of the first pair of electromagnetic engagement parts and connected to the third amplifier;
- a second coil forming the other one of the first pair of electromagnetic engagement parts and connected to the fourth amplifier;
- a first magnetic pin forming one of the second pair of electromagnetic engagement parts;
- a second magnetic pin forming the other of the second pair of electromagnetic engagement parts;
- a first Hall element disposed on the base plate and positioned for magnetically engaging the first magnetic pin;
- a second Hall element disposed on the base plate and positioned for magnetically engaging the second magnetic pin;
- a fifth amplifier connected to the Hall output of the first Hall element;
- a sixth amplifier connected to the Hall output of the second Hall element;
- a first comparator connected to the fifth amplifier for comparing the output of the fifth amplifier with a reference voltage and having an output connected to the first electronic switch; and
- a second comparator connected to the sixth amplifier for comparing the output of the fifth amplifier with a reference voltage and having an output connected to the second electronic switch.

17. The magnetic tape recorder for video recording and playback according to claim 12 further comprising
- a single head drum to be surrounded by the magnetic tape like an omega over an angle of more than about 270 degrees;
- a dynamic track follow control for adjusting the level of the video head and disposed on the base plate;
- a static acting adjustment provision for the head drum vis-a-vis the magnetic tape around two axes, where the first adjustment is in the direction of the rotation axis and where the second adjustment is in a direction vertical to the first direction versus the magnetic tape in order to change the inclination of the head drum relative to the tape plane.

18. A method for video recording and playback with a magnetic tape comprising
- rotating a base plate for a video head with a first drive means;
- point supporting a head support plate on the base plate;
- spring restraining the head support plate versus the base plate to retain the point support;
- tilting the head support plate with electromagnetic engagement parts around an axis vertical relative to the contact plane between the video head and the magnetic tape depending on a desired azimuth angle of the video head gap versus the magnetic tape;
- electromagnetically determining the position of the head support plate versus the base plate around said axis; and
- adjusting the level of the video head versus the magnetic tape with a dynamic tape follow control by tilting the head support plate around an axis vertical to the first tilting axis and vertical to the rotation axis of the base plate.

19. The method for video recording and playback with a magnetic tape according to claim 18 further comprising
- wrapping the magnetic tape around a head drum with a slot over an angle of at least about 270 degrees;
- recording or, respectively, reproducing a field for each rotation of the drum head;
- statically adjusting the position of the head drum versus the magnetic tape around two mutually vertical axes where the first axis is it the direction of the rotation axis of the head drum and where the second axis is in a direction vertical to the first axis versus the magnetic tape for changing the inclination of the head drum to the tape plane;
- sensing the rotary position of a head drum motor having a magnet with a coil;
- amplifying the signal provided by the coil;
- shaping the amplified signal with a monostable multivibrator;
- feeding the output of the monostable multivibrator to a flip-flop.

20. The method for video recording and playback with a magnetic tape according to claim 18 further comprising amplifying the signal coming from the tape head;
  determining the level of the signal versus noise;
  switching the amplified signal off if the noise level is too high;
  feeding the amplified signal to the flip-flop;
  feeding one output of the flip-flop to a first electronic switch;
  feeding the second output of the flip-flop to a second electronic switch;
  entering the output of the first electronic switch into a third amplifier;
  entering the output of the second electronic switch into a fourth amplifier;
  energizing a first coil with the output from the third amplifier;
  energizing a second coil with the output from the fourth amplifier;
  magnetically engaging a first magnetic pin attached to the head support plate with the current in the first coil;
  magnetically engaging a second magnetic pin attached to the head support plate with the current in the second coil;
  deflecting the electrons in a first Hall probe with the magnetic field of the first magnetic pin;
  deflecting the electrons in a second Hall probe with the magnetic field of the second magnetic pin;
  amplifying the Hall voltage generated in the first Hall probe in a fifth amplifier;
  amplifying the Hall voltage generated in the second Hall probe in a sixth amplifier;
  comparing the output of the fifth amplifier with a first reference signal in a first comparator;
  comparing the output of the sixth amplifier with a second refernce signal in a second comparator;
  feeding the output of the first comparator to the first electronic switch; and
  feeding the output of the second comparator to the second electronic switch.

* * * * *